United States Patent

[11] 3,554,214

[72] Inventor Stig Gote Stenlund
 Boras, Sweden
[21] Appl. No. 839,207
[22] Filed July 7, 1969
[45] Patented Jan. 12, 1971
[73] Assignee Monsun-Tison AB
 Boras, Sweden
 a company of Sweden
[32] Priority July 11, 1968
[33] Sweden
[31] 9567

[54] VALVE DEVICE WITH RELIEF ACTION AND SUCTION ACTION FOR HYDRAULIC SYSTEMS
9 Claims, 6 Drawing Figs.
[52] U.S. Cl..................................................... 137/270,
 137/493.6, 137/512.5
[51] Int. Cl..................................................... F16k 17/18
[50] Field of Search............................................ 137/270,
 271, 269.5, 270.5, 269, 512.5, 493.6, 493.3,
 493.7, 493.9

[56] References Cited
UNITED STATES PATENTS

| | | | |
|---|---|---|---|
| 1,229,885 | 6/1917 | Chadwick...................... | 137/493.6X |
| 2,393,589 | 1/1946 | Compton et al. ............. | 137/493.6X |
| 1,497,063 | 6/1924 | Brehmer....................... | 137/493.6X |
| 2,690,757 | 10/1954 | Orchowski ................... | 137/493.6X |

Primary Examiner—M. Cary Nelson
Assistant Examiner—Robert J. Miller
Attorney—Waters, Roditi, Schwartz & Nissen ABSTRACT: The invention relates to a valve device intended for connection into a pressure fluid conduit, as for instance a pressure fluid conduit from a pressure fluid source to a hydraulic motor. The valve device has a combined relief or overpressure valve action and suction or underpressure valve action; at excessive pressure in the pressure fluid conduit pressure fluid being discharged through the valve device to a tank and at underpressure in the pressure fluid conduit a communication being established through the valve device between the pressure fluid conduit and a tank conduit for neutralization of the underpressure in the pressure fluid conduit. The valve device is easily adjustable to give alternatively only the overpressure valve action or only the underpressure valve action. A preferred embodiment of the valve device can be connected into two different pressure fluid conduits, as for instance the two pressure fluid conduits from a pressure fluid source to the two cylinder chambers of a double action hydraulic cylinder. This preferred embodiment of the valve device gives overpressure valve action as well as underpressure valve action in both pressure fluid conduits and can easily be adjusted to discharge the overflowing pressure fluid at an excessive pressure in any one of the pressure fluid conduits alternatively to a tank conduit or directly to the other pressure fluid conduit.

VALVE DEVICE WITH RELIEF ACTION AND SUCTION ACTION FOR HYDRAULIC SYSTEMS

The invention relates to a valve device having relief or overpressure valve action as well as suction valve action and in particular a valve device of this type intended to be connected to or inserted in one or both of the pressure fluid conduits to a hydraulic motor, for instance a hydraulic cylinder, driven from a pressure fluid supply.

The object of the invention is to provide a valve device of this type which is easily adjustable to give different desired flow combinations in a hydraulic system in which the valve device is inserted.

A more specific object of the invention is therefore to provide a valve device which can be connected to or inserted in the pressure fluid conduits to a hydraulic motor and which includes for at least one of these pressure fluid conduits or for both of them a pressure limiting or relief valve, which opens for discharging pressure fluid from the connected fluid pressure conduit at excessive pressure or overpressure in this conduit, as well as a suction valve, which opens at a too low pressure or underpressure in the connected pressure fluid conduit for equalization of this underpressure. In particular, it is the object of the invention to provide a valve device of this type, the operation of which is easily selectable so that the relief valve can discharge pressure fluid at excessive pressure or overpressure in the connected pressure fluid conduit either to a tank conduit or to the other pressure fluid conduit for the same hydraulic motor.

According to the invention these and further objects are obtained by a valve device comprising a valve body with at least a first longitudinal bore and first and second stationary valve seats at opposite ends of said bore, a first valve member disposed in said bore between said first and second valve seats and provided with a first and a second valve cone located at opposite ends of said valve member facing in opposite directions for cooperating with said first and second stationary valve seats respectively and with force exerting means urging said valve cones into sealing relationship with said valve seats, said valve member permitting a fluid flow in said longitudinal bore between said first and second stationary valve seats, at least a first fluid chamber in said valve body located at one end of said longitudinal bore so as to communicate with said bore via one of said stationary valve seats, said valve member being provided with relief valve means at the end of the valve member closest to said first fluid chamber for opening at a fluid pressure in said bore exceeding a predetermined value to establish communication between said bore and said first fluid chamber, and said valve body being provided with a first pressure fluid port communicating with said longitudinal between said first and second valve seats and adapted to be connected to a pressure fluid conduit and a first tank port communicating with said first fluid chamber and adapted to be connected to a tank conduit.

In a preferred embodiment of the invention the valve body is provided with an additional second longitudinal bore indentical to said first bore and adapted to receive an additional second valve member identical to said first valve member and communicating with additional ports and fluid chamber identical to said parts and fluid chamber respectively provided for said first bore, the valve body being provided with a fluid flow passage between the ends of said first and second bores opposite to the end of the respective bore closest to said first fluid chamber. In this preferred embodiment of the invention the valve members with their valve cones and the bores with their associated stationary valve seats respectively are so dimensioned that each valve member can be mounted in its associated bore facing alternatively in the one or in the opposite or reversed direction.

With a valve device according to this preferred embodiment of the invention it is possible to obtain a large number of different operations of the valve device by mounting a valve member only in one of the valve bores while sealing the open end of the other bore or by mounting valve members in both bores and by reversing the mounting direction of the valve members in their associated bores. With such a valve device connected to the two fluid pressure conduits to a hydraulic motor, as for instance a hydraulic cylinder, and to a tank conduit it is possible for instance to obtain following different operations of the valve device:

a. With a valve member mounter only in the one bore and the other bore sealed the valve device functions as a relief or overpressure valve and at the same time as a suction or underpressure valve for only the one motor connection and with the relief valve discharging the fluid to the tank conduit at excessive pressure or overpressure in the motor connection, this operation be obtainable for either one of the motor connections by mounting the valve member in the one or the other bore;

b. With valve members mounted in both bores the valve device can dependent on the mounting direction of the valve members in their associated bores operate as:

1. A relief valve and at the same time a suction valve in both motor connections, the overflowing fluid being discharged to the tank conduit at excessive overpressure in the motor connections;
2. a so-called "cross-over" or "double" safety valve, which at excessive pressure or overpressure in anyone of the motor connections discharges the overflowing fluid directly to the other motor connection, and at the same time as a suction valve for both motor connections, or
3. a "mixed" relief valve, which at excessive or overpressure in the one motor connection discharges the overflowing fluid directly to the other motor connection, whereas at excessive pressure or overpressure in said other motor connection the overflowing fluid is discharged to the tank conduit, and at the same time as a suction valve for both motor connections.

The valve member or valve members of a valve device according to the invention can also easily be designed so as to be adjustable to give only relief valve action or alternatively only suction valve action.

All these various operations are obtainable with one or two valve members mounted in a common valve body, the desired type of operation being selectable by the way the valve members are mounted in their associated bores in the valve body.

In the following the invention will be further described with reference to the accompanying drawings, in which.

Figure 1:
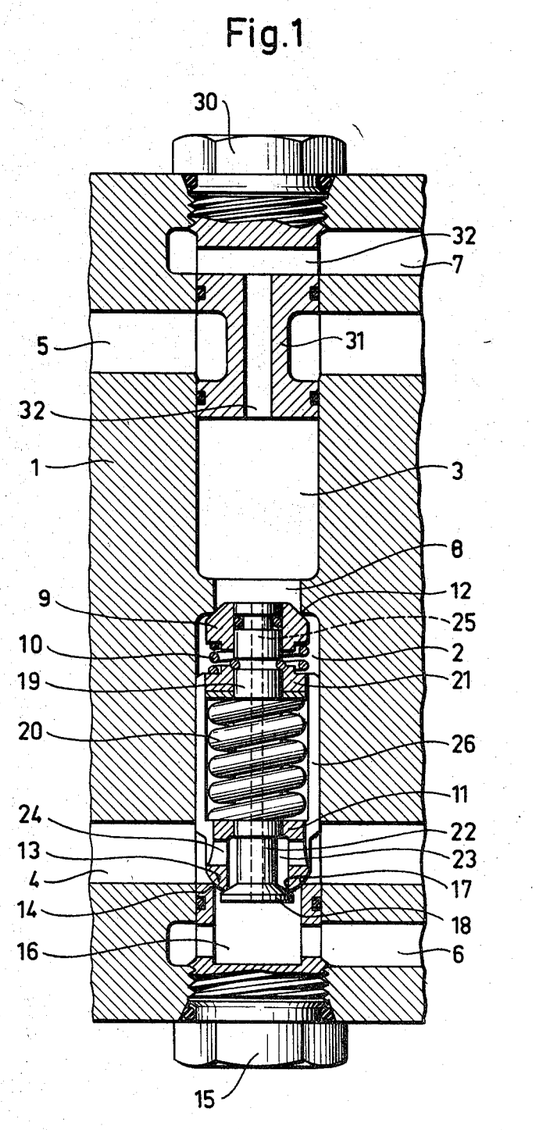
FIG. 1 shows by way of example and in axial section an embodiment of a valve device according to the invention having a valve body provided with two longitudinal bores for two valve members, only one valve member, however, being mounted in the one bore whereas the other bore is sealed.

FIG. 1 shows a valve device according to the invention comprising a valve body 1 provided with two identical longitudinal bores 2 and 3, each adapted to receive a valve member. For each of the bores 2 and 3 respectively the valve body 1 is provided with a pressure fluid flow passage 4 and 5 respectively, which communicates with the associated bore and passes through the valve body 1 and is adapted to be connected into a pressure fluid conduit from a direction control valve (not shown in the drawing) to the one actuating chamber of a hydraulic motor, for instance the one cylinder chamber of a hydraulic cylinder (not shown in the drawing). For each bore 2 and 3 respectively the valve body 1 is also provided with an outlet or tank port 6 and 7 respectively adapted to be connected for instance to a tank conduit. The bores 2 and 3 communicate with each other at their bottom ends through a flow passage 8 in the valve body 1.

In the valve device according to the invention illustrated in FIG. 1 a valve member is mounted only in the one bore 2, whereas the other bore 3 is sealed with a plug 30 having a narrow waist 31 permitting a fluid flow through the flow passage 5 adapted to be connected into a pressure fluid conduit. The plug 30 is also provided with an internal flow passage 32 establishing a communication between the inner end of the bore 3 and the outlet port 7, which is adapted to be connected to a tank.

The valve member according to the invention mounted in the bore 2 is provided with two valve cones 9 and 13 respectively located at opposite ends of the valve member so as to face in opposite direction. The valve cone 13 is integral with the main potion 11 of the valve member, whereas the valve cone 9 is axially movable relative to the main portion 11 of the valve member. A coil spring 10 acting between the valve cone 9 and the main portion 11 of the valve member urges the valve cone 9 and the valve cone 13 in opposite directions, that is away from each other. The valve cone 9 is urged into sealing relationship with a stationary valve seat 12 at the bottom end of the bore 2 between the bore and the flow passage 8, whereas the other valve cone 13 at the opposite end of the valve member is urged into sealing relationship with a stationary valve seat 14. This valve seat is provided in a plug 15 which is screwed into the open end of the bore 2 and which is provided with a recess 16 communicating with the outlet port 6 of the valve body 1 and having an annular rim forming the stationary valve seat 14 cooperating with the valve cone 13.

The valve formed by the cooperating valve cone 13 and valve seat 14 is consequently located between the outlet port 6, which is adapted to be connected to a tank conduit, and the bore 2, which communicates with the flow passage 4 adapted to be connected into a pressure fluid conduit. The main portion 11 of the valve member is provided with longitudinal grooves or flow passages 26 in its circumference permitting a fluid flow within the bore 2 along the valve member between the valve seat 14 at the outer end of the bore 2 and the valve seat 12 at the bottom end of the bore. Consequently, the valve formed by the cooperating valve cone 9 and valve seat 12 is located between the flow passage 4 adapted to be connected into the pressure fluid conduit and the flow passage 8, which communicates via the other bore 3 and the passage 32 in the sealing plug 30 with the outlet port 7, which is also adapted to be connected to a tank conduit.

Further, the valve member is provided with a relief or overpressure valve located in the valve cone 13. This relief valve consists of an annular valve seat 17 provided in the valve cone 13 and a valve disc 18 cooperating with said valve seat 17. The valve disc 18 is attached to the one end of a valve rod 19 axially movable in the main portion 11 of the valve member and is urged into sealing relationship with the valve seat 17 by a biassing coil spring 20 acting against a washer 21 mounted on the valve rod 19. The valve rod 19 has a reduced portion 22 located in a cavity 23 in the valve cone 13. This cavity 23 communicates through radial openings 24 with the bore 2 and thus with the pressure fluid flow passage 4. Thus, the cooperating valve seat 17 and valve disc 18 form a relief or overpressure valve, which is located between the flow passage 4 and the outlet port 6 and which opens at an excessive pressure in the flow passage 4 determined by the difference in cross-sectional area between the valve rod 19 and the opening surrounded by the valve seat 17 and by the biassing force of the coil spring 20.

The valve device according to the invention shown in FIG. 1 operates as a relief or overpressure valve in the following manner: The pressure in the pressure fluid conduit which is connected to the flow passage 4 and thus communicates with the cavity 23 in the valve cone 13 acts against the backside of the valve disc 18. When this pressure exceeds the biassing force of the coil spring 20, the valve disc 18 is lifted from its seat 17 in the valve cone 13 of the main portion 11 of the valve member, whereby the overflowing pressure fluid is discharged into the recess 16 in the plug 15 and thus to the outlet port 6 which is connected to a tank conduit. In order to secure a reliable operation of this type, if there should not exist a communication to the tank from both ends of the valve member as the case is in the valve device illustrated in FIG. 1, that is if the valve body 1 should be provided with only one bore 2 having a closed bottom end instead of the communication passage 8 or if the sealing plug 30 screwed into the open end of the other bore 3 should not be provided with the communication passage 32 to the outlet port 7, the valve member is provided with an axial bore 25 extending through the valve disc 18 and its valve rod 19. Through this axial bore 25 any pressure fluid leaking past the sealing between the valve cone 9 and the associated valve seat 12 can flow to the tank through the outlet port 6. Thanks to this longitudinal bore 25, which forms a restricted flow path between the spaces in the valve body located at opposite ends of the valve member, it is secured that tank conduit pressure is present at both ends of the valve member, whereby a reliable operation of the valve device is guaranteed under all conditions.

As a suction or underpressure valve the valve device illustrated in FIG. 1 operates in the following way: If the fluid pressure in the pressure fluid conduit which is connected to the flow passage 4 and thus to the bore 2 falls below the fluid pressure in the tank conduit connected to the outlet ports 6 and 7, the fluid pressure in the tank conduit acting upon the two end surfaces of the valve member, on the one hand in the recess 16 in the plug 15 and on the other hand in the fluid passage 8 between the two bores 2 and 3, will overcome the biassing force of the coil spring 10, whereby the entire valve member is compressed and shortened. Thereby the valve cone 13 will be lifted from its associated seat 14 and/or the valve cone 9 be lifted from its associated seat 12 so that a communication is established from the outlet port 6 through the valve 13,14 and/or from the outlet port 7 through the valve 9,12 to the flow passage 4 connected to the pressure fluid conduit, whereby the prevailing underpressure in this pressure fluid conduit is neutralized. It is appreciated that this suction valve action is obtained even if, as mentioned above, the valve body 1 is provided with only one bore 2 or the sealing plug 30 screwed into the other bore 3 does not have the communication passage 32 to the outlet port 7.

It is also appreciated that the valve device can easily be adjusted to operate only as a relief valve, if the coil spring 10 is tightened to be fully compressed, for instance by the aid of additional washers, or alternatively to operate only as a suction valve, if the coil spring 20 is tightened to be fully compressed.

It is also appreciated that the valve device illustrated in FIG. 1 can easily be modified to operate as a combined relief valve and suction valve for both of the pressure fluid conduits connected to the flow passages 4 and 5 in the valve body, as for instance the pressure fluid conduits to the two cylinder chambers of a hydraulic cylinder, in that an additional second valve member is mounted also in the other bore 3 in exactly the same way as the valve member positioned in the bore 2.

In certain closed hydraulic systems, however, it is not desired that the relief valve discharges the overflowing pressure fluid to a tank at an excessive pressure in a pressure fluid conduit but that the overflowing pressure fluid is instead discharged directly from the pressure fluid conduit with excessive pressure to another pressure fluid conduit, for instance to the pressure fluid conduit connected to the other cylinder chamber of the same hydraulic motor. Such an operation can readily be obtained with the valve device according to the invention illustrated in FIG 1 in that valve members are mounted in both bores 2 and 3 but in the opposite or reversed direction as compared to FIG. 1 so that the valve members positioned in the two bores 2 and 3 have their valve cones 13 provided with the relief valves 17,18 facing the communication passage 8 between the bores.

Figure 2:
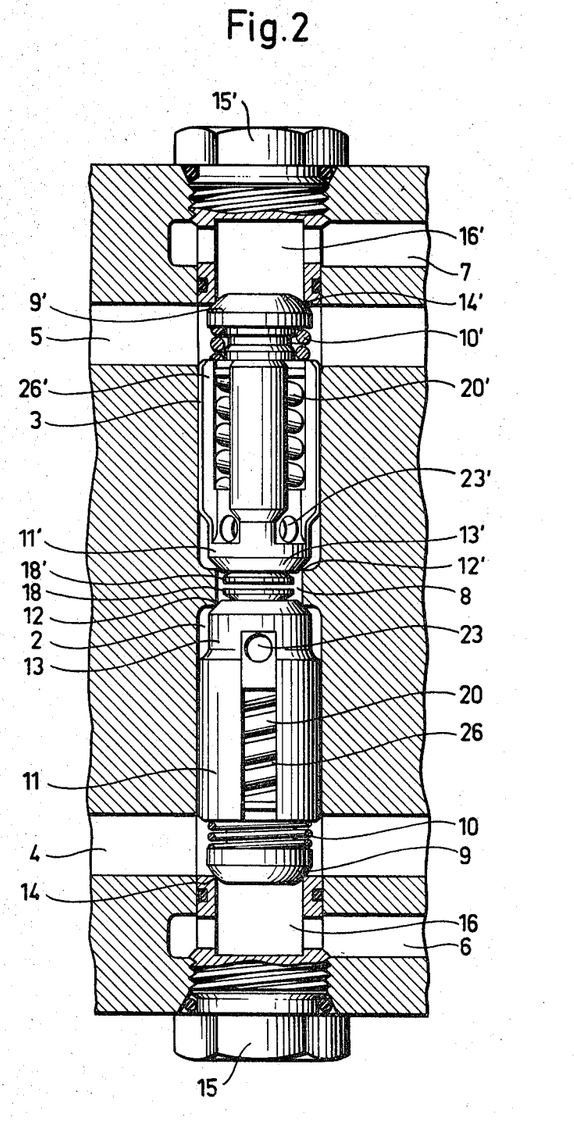
FIG. 2 shows the same valve device as in FIG. 1 but with valve members mounted in both bores in the opposite or reversed direction as compared with the single valve member in the valve device in FIG. 1.

FIG. 2 in the accompanying drawing illustrates the valve device modified in this way, the various parts of the valve member mounted in the bore 3 and all other details associated with this bore being provided with the same reference characters as the corresponding parts or details in the bore 2 followed by a prime sign. Consequently, in this valve device according to the invention the valve members are inserted or mounted in their associated bores 2 and 3 so as to have their relief valve discs 18 and 18' respectively facing each other, the valve cones 13 and 13' respectively cooperating with the stationary valve seats 12 and 12' at the communication passage 8 between the bottom ends of the bores 2 and 3 and the valve cones 9 and 9' respectively cooperating with the stationary valve seats 14 and 14' respectively in the plugs 15 and 15' respectively screwed into the open ends of the bores. If the fluid pressure in either one of the pressure fluid conduits connected to the flow passages 4 and 5 in the valve body 1 should exceed the preset opening pressure for the relief valve of the valve member mounted in the associated bore 2 or 3 respectively, this relief valve will open as described in the foregoing and establish a communication from the pressure fluid conduit having the excessive pressure (4 or 5) to the flow passage 8 between the two bores 2 and 3. The valve member mounted in the other bore (on the low-pressure side) will then be compressed against the action of the biassing spring 10 so that the pressure fluid from the high-pressure side in the flow passage 8 can discharge directly into the other pressure fluid conduit (4 or 5) through the longitudinal grooves or passages 26 in the main portion of said valve member. Thus, the overflowing pressure fluid at an excessive pressure in either one of the pressure fluid connections 4 and 5 is not discharged to the tank but directly to the other pressure fluid connection. Should a too low pressure or underpressure appear in either one of the pressure fluid connections 4 and 5, the valve device will operate as a suction valve in the manner described in the foregoing with reference to FIG. 1 so that a communication is established between the pressure fluid conduit having the too low pressure and the associated tank connection 6 or 7 for neutralization of the underpressure.

Figure 3:
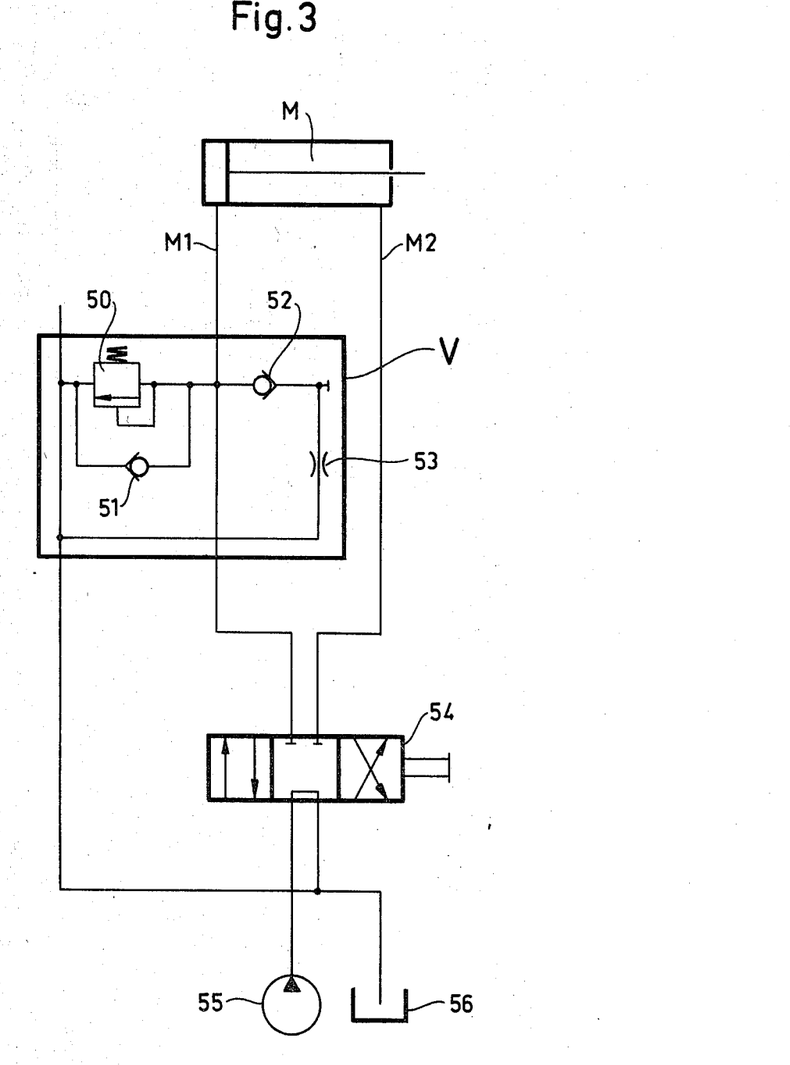
FIG. 3 is a hydraulic circuit diagram for a valve device of the type illustrated in FIGS. 1 and 2 connected to the pressure fluid conduits to a hydraulic motor and adjusted to give the type of operation described in point (a) in the foregoing.

FIG. 3 is a hydraulic circuit diagram for a hydraulic system including a valve device according to the invention designed as illustrated in FIG. 1 and adjusted to operate as a combined relief valve and suction valve only for the one pressure fluid conduit to a hydraulic cylinder. The valve device according to the invention is schematically illustrated within the frame V; the relief or overpressure valve 17, 18 with its associated biassing spring 20 being illustrated by the symbol 50, the valve formed by the cooperating valve cone 13 and valve seat 14 being illustrated by the symbol 51, the valve formed by the cooperating valve cone 9 and valve seat 12 being illustrated by the symbol 52 and the restricted flow passage 25 by the symbol 53. The relief or overpressure valve 50 is consequently connected to the one pressure fluid conduit M1 to the hydraulic cylinder M, whereas the other pressure fluid conduit M2 to the other cylinder chamber of the hydraulic cylinder M has no relief valve or suction valve connected to it. The pressure fluid conduits M1 and M2 for the hydraulic cylinder M are connected to a control device consisting of a direction control valve 54, which in turn is connected to a pressure fluid pump 55 and a tank 56. The tank 56 is also connected to the discharge end of the relief valve 50 and to the suction valves 51 and 52 in the valve device according to the invention. It should be noted that in the circuit diagram in FIG. 3 it has been assumed that the sealing plug 30 screwed into the bore 3 in the valve device illustrated in FIG. 1 is not provided with the communication passage 32, wherefore the suction valve 52 formed by the cooperating valve cone 9 and valve seat 12 has a communication with the tank 56 only through the longitudinal bore 25 forming the flow restriction 53.

Figure 4:
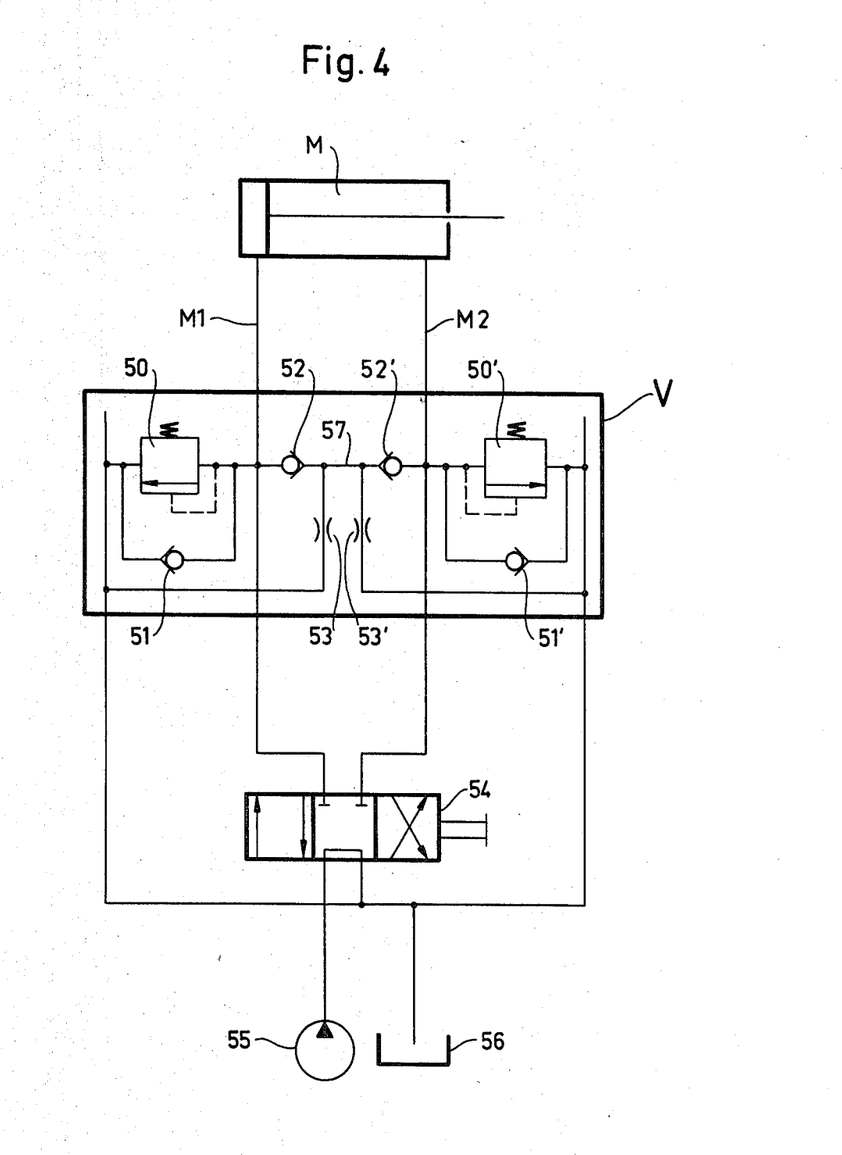
FIG. 4 is a hydraulic circuit diagram for the same valve device adjusted to give the type of operation described in point (b1) in the foregoing.

FIG. 4 is a hydraulic circuit diagram for a valve device according to FIG. 1 but with valve members mounted in both bores 2 and 3 with the direction illustrated in FIG. 1, that is with the valve cones 9 of the two valve members facing each other. In this case consequently, the valve device is connected into both pressure fluid conduits M1 and M2 to both cylinder chambers of the hydraulic cylinder M and will operate as a relief or overpressure valve and at the same time as a suction valve in both pressure fluid conduits to the hydraulic motor M, the overflowing pressure fluid at an excessive pressure in anyone of these pressure fluid conduits being discharged to the tank 56. The valve device has consequently an operation as described under (b1in the foregoing. The connection designated with 57 in the circuit diagram in FIG. 4 consists of the communication passage 8 between the two bores 2 and 3. The valve functions of the valve member mounted in the bore 3 are provided with the same reference characters as the valve functions of the valve member mounted in the bore 2 but followed by a prime sign.

Figure 5:
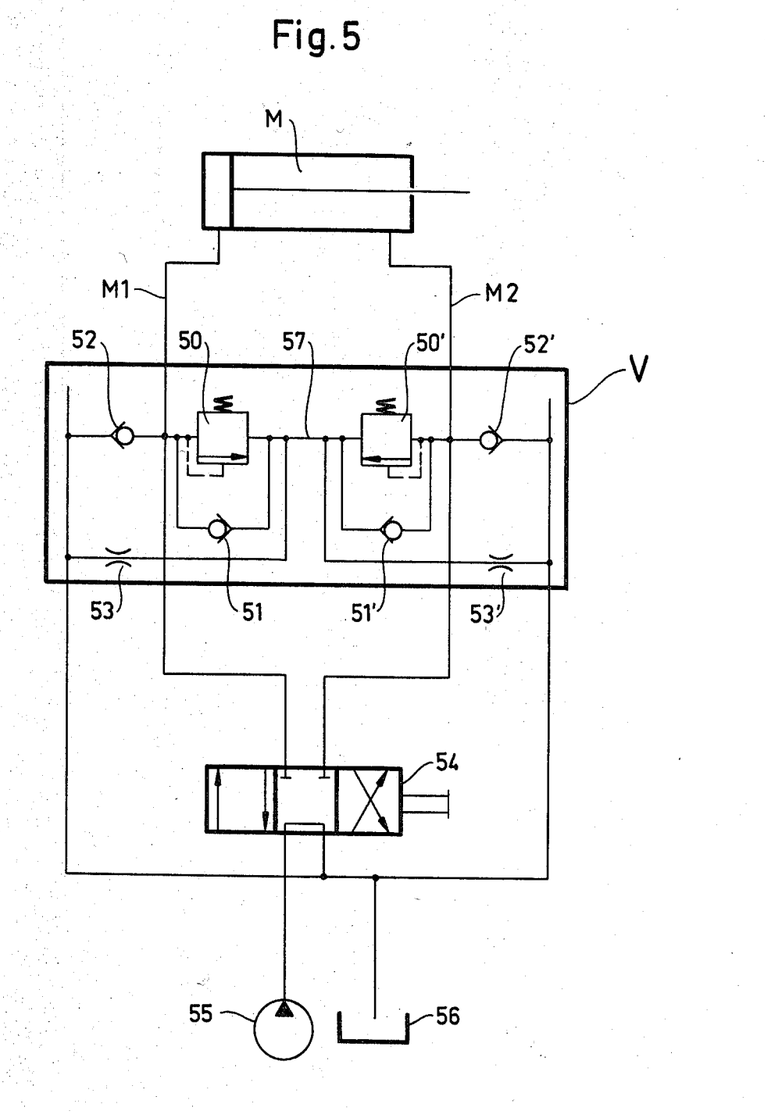
FIG. 5 is a hydraulic circuit for the same valve device adjusted to give the type of operation described in point (b2) in the foregoing.

FIG. 5 illustrates the circuit diagram for a valve device designed as illustrated in FIG. 2 and connected into both pressure fluid conduits to the hydraulic cylinder. In this case consequently the valve device will operate as a so-called "crossover" safety valve with suction valve action for both pressure fluid conduits to the hydraulic motor as described under (b2) in the foregoing. As in this case the two valve members are mounted in their associated bores in the manner illustrated in FIG. 2, it should be noted that the suction valve 51 is formed by the valve cone 13 and the valve seat 12 and that the suction valve 52 is formed by the valve cone 9 and the valve seat 14 and correspondingly for the suction valves 51' and 52' formed by the other valve member mounted in the other bore of the valve body.

Figure 6:
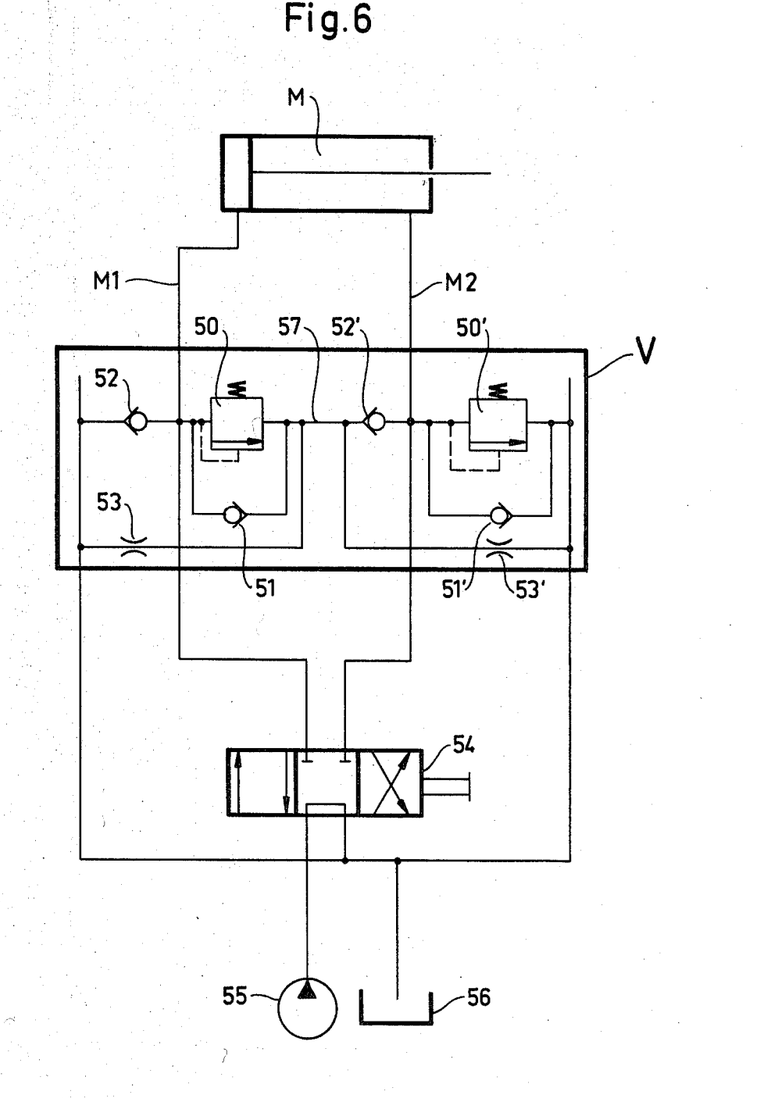
FIG. 6 is a hydraulic circuit diagram for the same valve device adjusted to give the type of operation described in (b3) in the foregoing.

FIG. 6 illustrates the hydraulic circuit diagram for a valve device according to the invention having a valve body as illustrated in FIGS. 1 and 2 and provided with valve members in both bores 2 and 3 and connected to the two pressure fluid conduits M1 and M2 to a hydraulic cylinder M. In this case, however, the valve member in the bore connected to the pressure fluid conduit M1 is mounted in the position shown in FIG. 2 with the relief valve facing the communication passage 8, whereas the valve member in the bore 3 connected to the pressure fluid conduit M2 is mounted in the position illustrated in FIG. 1 with the valve cone 9 facing the communication passage 8. Thus, the suction valve 52 is in this case formed by the cooperating valve cone 9 and valve seat 14, the suction valve 51 by the cooperating valve cone 13 and valve seat 12, the suction valve 52' by the cooperating valve cone 9' and valve seat 12' in the bore 3 and the suction valve 51' by the cooperating valve cone 13' and valve seat 14' in the bore 3. Consequently, the valve device will in this case have an operation as described in (b3) in the foregoing, whereby the overflowing pressure fluid at an excessive pressure in the pressure fluid conduit M1 is discharged directly to the other pressure fluid conduit M2, whereas the overflowing pressure fluid at an excessive pressure in the pressure fluid conduit M2 is discharged to the tank 56. At an underpressure in either one of the pressure fluid conduits M1 and M2 a communication is established between this conduit and the tank.

I claim:

1. A valve device comprising a valve body (1) having at least a first longitudinal bore (2) and first and second stationary valve seats (12,14) at opposite ends of said bore, a first valve member mounted in said first bore and permitting an axial fluid flow in said first bore between said first and second stationary valve seat, said first valve member including first and second valve cones (9,13) facing in opposite directions at opposite ends of said valve member for cooperating with said first and second stationary valve seats respectively, said first and second valve cones being mutually axially movable, and force exerting means (10) acting between said first and second valve cones for urging them into sealing relationship with said first and second valve seats respectively, a first fluid chamber (16) located at the one end of said first longitudinal bore so as to communicate therewith via one of said stationary valve seats (14), said first valve member also including an overpressure valve (17,18) provided in the end of the valve member closest to said first fluid chamber for opening and establishing communication between said first bore (2) and said first fluid chamber (16) when the fluid pressure in said bore exceeds a predetermined value, a first pressure fluid port (4) in said valve body (1) communicating with said first bore (2) between said first and second valve seats and adapted to be connected to a pressure fluid conduit, and a first outlet port (6) in said valve body (1) communicating with said first fluid chamber (16) and adapted to be connected to a tank conduit.

2. A valve device as claimed in claim 1, wherein a second fluid chamber (8) is provided in said valve body (1) at the other end of said first longitudinal bore (2) so as to communicate therewith via the other one of said stationary valve seats (12) and said first valve member is provided with an axial bore (25) extending from the one end to the opposite end of the valve member and forming a flow passage between said first and second fluid chambers (16,8).

3. A valve device as claimed in claim 2, wherein said first bore (2) has a bottom end provided with said second stationary valve seat (12) and communicating with said second fluid chamber (8) and an open end, a plug (15) being inserted in said open end of said first bore, said plug including said first fluid chamber (16) and being provided with said first stationary valve seat (14) between said first fluid chamber and said first bore.

4. A valve device as claimed in claim 1, wherein said valve body (1) includes a second fluid chamber (8) located at the other end of said first bore (2) so as to communicate therewith via the other stationary valve seat (12), and a second outlet port (7) communicating with said second fluid chamber (8) and adapted to be connected to a tank conduit.

5. A valve device as claimed in claim 1, wherein said first and second stationary valve seats (12,14) have the same shape and size and said first and second valve cones (9,13) on said first valve member have also the same shape and device, whereby the valve member can be selectively mounted in said first bore in anyone of two mutually reversed positions.

6. A valve device as claimed in claim 1, wherein said valve body (1) has a second longitudinal bore (3) similar to said first longitudinal bore (2) with third and fourth stationary valve seats (14', 12') at opposite ends of said second bore; a second valve member similar to said first valve member being mounted in said second bore for cooperation with said third and fourth stationary valve seats; the valve body including also a second fluid chamber (8) communicating with said first and second bores (2,3) via said second and fourth stationary valve seats (12,12') respectively, a third fluid chamber (16') communicating with said second bore (3) via said third stationary valve seat (14'), a second pressure fluid port (5) communicating with said second bore (3) between said third and fourth valve seats and adapted to be connected to a pressure fluid conduit, and a second outlet port (7) communicating with said third fluid chamber (16') and adapted to be connected to a tank.

7. A valve device as claimed in claim 6, wherein said stationary valve seat (12,14,12',14') have the same shape and size and said first and second valve cones (9,13,9',13') on said first and second valve members respectively also have the same shape and size, whereby each of said valve members can be mounted selectively in any one of two mutually reversed positions in its associated bore.

8. A valve device as claimed in claim 1, wherein the minimum axial spacing between said first and second valve cones (9,13) of said first valve member corresponds to the axial spacing between said first and second stationary valve seats (14,12) so that said valve cones cannot be lifted from their associated stationary valve seats.

9. A valve device as claimed in claim 1, wherein said first valve member includes biassing means (20) for said relief valve (17,18) for determining the opening pressure of said relief valve, said biassing means (20) being adjustable to maintain said overpressure valve (17) closed against any overpressure.